United States Patent [19]

Crooker et al.

[11] Patent Number: 5,108,665
[45] Date of Patent: Apr. 28, 1992

[54] ENSTATITE BODY AND METHOD

[75] Inventors: David H. Crooker, Corning; Lina M. Echeverria, Painted Post, both of N.Y.

[73] Assignee: Corning Incorporated, Corning, N.Y.

[21] Appl. No.: 480,914

[22] Filed: Feb. 16, 1990

[51] Int. Cl.$^5$ .................. B29B 9/00; C04B 33/32; C03C 3/00
[52] U.S. Cl. .......................... 264/6; 264/11; 264/12; 264/56; 501/12
[58] Field of Search .................. 264/11, 12, 56, 6; 501/109, 108, 122, 12

[56] References Cited

U.S. PATENT DOCUMENTS 4,608,215  8/1986  Gonczy et al. .................. 264/56
4,871,693  10/1989  Inoue et al. .................. 501/9

OTHER PUBLICATIONS

Japanese Abstract No. 01-192709 published Nov./6/89.

Primary Examiner—James Lowe
Assistant Examiner—Christopher A. Fiorilla
Attorney, Agent, or Firm—Milton M. Peterson; Clinton S. Janes, Jr.

[57] ABSTRACT

A method of producing a pure enstatite material involves dissolving thermally decomposable magnesium and silicon compounds, generating an aerosol from the solution(s), subjecting the aerosol droplets to a thermal influence to convert the droplets into solid particles, dispersing the particles in an organic liquid to form a colloidal sol, subjecting the sol to a gelling agent to form a semi-solid gel, drying the gel and sintering the dried gel to a dense enstatite body.

43 Claims, 2 Drawing Sheets

ENSTATITE BODY AND METHOD

FIELD OF THE INVENTION

The invention is in the field of ceramic materials, more particularly, enstatite ceramics and their production.

BACKGROUND OF THE INVENTION

Enstatite, a magnesium silicate ($MgSiO_3$), is a refractory chain silicate that exhibits a unique combination of properties: high strength and toughness combined with refractoriness and high creep resistance. The mineral undergoes a martensitic transformation from the orthorhombic phase, protoenstatite, to the monoclinic phase, clinoenstatite. This transformation develops polysynthetic twinning, which is responsible for an unusually high fracture toughness. Thus, enstatite is a transformation toughened material that has high use temperatures in the range of 1200°–1500° C.

Heretofore, essentially pure enstatite has not been available, since $MgSiO_3$ is not a glass forming composition. Therefore, other glass formers and modifiers, such as $ZrO_2$, $Li_2O$ and $BaO$, need to be incorporated in order to melt a glass.

U.S. Pat. No. 4,687,749 (Beall) discloses a family of $MgO-Al_2O_3-SiO_2$ glasses capable of being converted to glass-ceramics. In the glass-ceramic state, one or more polymorphs of enstatite constitute the primary crystal phase, along with various secondary phases. These secondary phases impart properties to the material that differ from those of pure enstatite.

PURPOSES OF THE INVENTION

A basic purpose of the invention is to provide a dense, sintered body of essentially pure enstatite.

Another purpose is to provide such a body having a controlled ratio of polymorphic phases in which the protoenstatite phase predominates.

A further purpose is to provide an essentially pure magnesium silicate material that may be converted into a dense, sintered, enstatite body.

A still further purpose is to provide a method of producing such a material having an essentially constant stoichiometry.

Another purpose is to provide such a material by utilizing a technique known as soot casting.

SUMMARY OF THE INVENTION

The material aspect of the invention is an essentially pure, magnesium silicate material consisting of 35–42% MgO and the remainder $SiO_2$, and capable of being converted to a sintered body having a chain silicate structure characteristic of enstatite. Preferably, the material has a constant stoichiometry that ideally is in a Mg:Si atomic ratio of 1:1. The material may be in the form of submicron particles, or dispersed in a medium as a colloidal sol. The article embodiment is a dense, sintered ceramic body composed of an essentially pure magnesium silicate. It has an enstatite structure and a composition of 35–42% MgO by weight and the remainder $SiO_2$. Preferably, the body has a density of about 3.2, has a uniform stoichiometric atomic ratio of 1:1 Mg:Si; and is predominantly in the protoenstatite phase.

The invention further comprehends a method of producing essentially pure particles composed of MgO and $SiO_2$ in constant stoichiometry. The method comprises forming a solution of a magnesium compound and of a silicon compound, both compounds being thermally decomposable, generating an aerosol from the solution(s), subjecting the aerosol to a thermal influence to convert the liquid droplets into solid particles of submicron size that are composed of MgO and $SiO_2$ in constant stoichiometry.

The aerosol may be generated from a single solution. Alternatively, separate solutions may be employed, the solutions being combined before the aerosol is generated and subjected to the thermal influence. The thermal influence may be a heated tubular furnace, or may be a burner flame. The aerosol is preferably generated by gaseous impact on a liquid stream with a gas, such as nitrogen. The enstatite particles collected from the flame may be dried, and then dispersed in a suitable medium to form a colloid capable of being gelled. The colloid may be placed in a mold of desired shape and gelled in the mold, preferably with ammonia gas. The gelled body may be dried and sintered at a temperature of 1000°–1450° C.

PRIOR LITERATURE

The following United States patents pertain to related subject matter:

U.S. Pat. No. 3,883,336 (Randall) describes a method of producing a glass body which comprises forming a gas stream containing vapors of a compound that will hydrolyze to a glass forming oxide, nebulizing an oxide forming compound, or solution, to form a mist in the nature of an aerosol, and simultaneously directing the mist and gas stream into a flame to form and codeposit a mixture of oxides. This is basically a modified flame hydrolysis process. It produces an oxide mixture for a glass, rather than a crystalline silicate such as enstatite.

U.S. Pat. No. 4,561,872 (Luong et al.) describes treating submicron size oxide particles with an alcohol to render them hydrophobic prior to forming a suspension that is cast to desired form, gelled, dried and fired. The patent is concerned only with single oxides, and does not employ an aerosol system.

U.S. Pat. Nos. 4,541,855 (Scherer) and 4,574,063 (Scherer) disclose forming a glass or ceramic article by suspending a particulate oxide in a non-aqueous medium, casting the suspension to desired shape, gelling the suspension, drying the gelled shape and, optionally, sintering the body. There is no disclosure of forming mixed oxide, crystalline products, and no teaching of an aerosol system.

U.S. Pat. No. 4,604,118 (Bocko et al.) describes a vapor phase method for the synthesis of $MgO-Al_2O_3-SiO_2$ products. $SiCl_4$, aluminum halide and organometallic magnesium vapors are oxidized by flame oxidation, and the oxides collected and sintered to glass or ceramic products. This does not relate to use of an aerosol system.

In addition, a pending application, Ser. No. 381,813, filed Jul. 19, 1989, and assigned to the assignee of this application, discloses a method for synthesizing fluorine-containing, aluminosilicate crystals, corresponding to topaz. Vapors of readily oxidizable compounds of silicon, and of aluminum and fluorine, are passed into a flame oxidation burner, the vapors being separately injected into the flame in a shielded manner. The amorphous products of combustion are collected and sintered into an integral body in a fluorine-containing atmosphere. This does not employ an aerosol system, and does not produce a material related to enstatite.

BRIEF DESCRIPTION OF THE DRAWING

In the accompanying drawing.

GENERAL DESCRIPTION OF THE INVENTION

In accordance with the invention, a chain silicate, enstatite, is synthesized from solutions of thermally decomposable, magnesium and silicon compounds. It is well known to synthesize pure individual oxides, such as $SiO_2$ and $TiO_2$, from the corresponding halides by flame hydrolysis. Likewise, a mixture of pure oxides, for glass formation, may be deposited as described, for example, in the Bocko et al. patent. However, that technique, as heretofore practiced, does not produce a mineral, composed of chemically combined oxides, such as enstatite.

A key feature in the present invention is use of an aerosol system to generate solid magnesium silicate particles with constant stoichiometry. For present purposes, an aerosol is produced by providing a stream of a liquid, and impacting that stream with a pressurized gas to break the stream into droplets. The droplets are then directed into a thermal source where they are individually oxidized and coalesced to submicron size particles, and collected, for example, on a filter.

Two approaches were employed in putting into practice the present aerosol technique of particle formation. One approach is referred to as the furnace system, since the aerosol stream was delivered to, and drawn through, a heated furnace, in particular a tubular furnace. The other approach is referred to as a burner system, since the aerosol stream was directed into a flame where the droplets coalesced and oxidized, and were collected.

Figure 1:
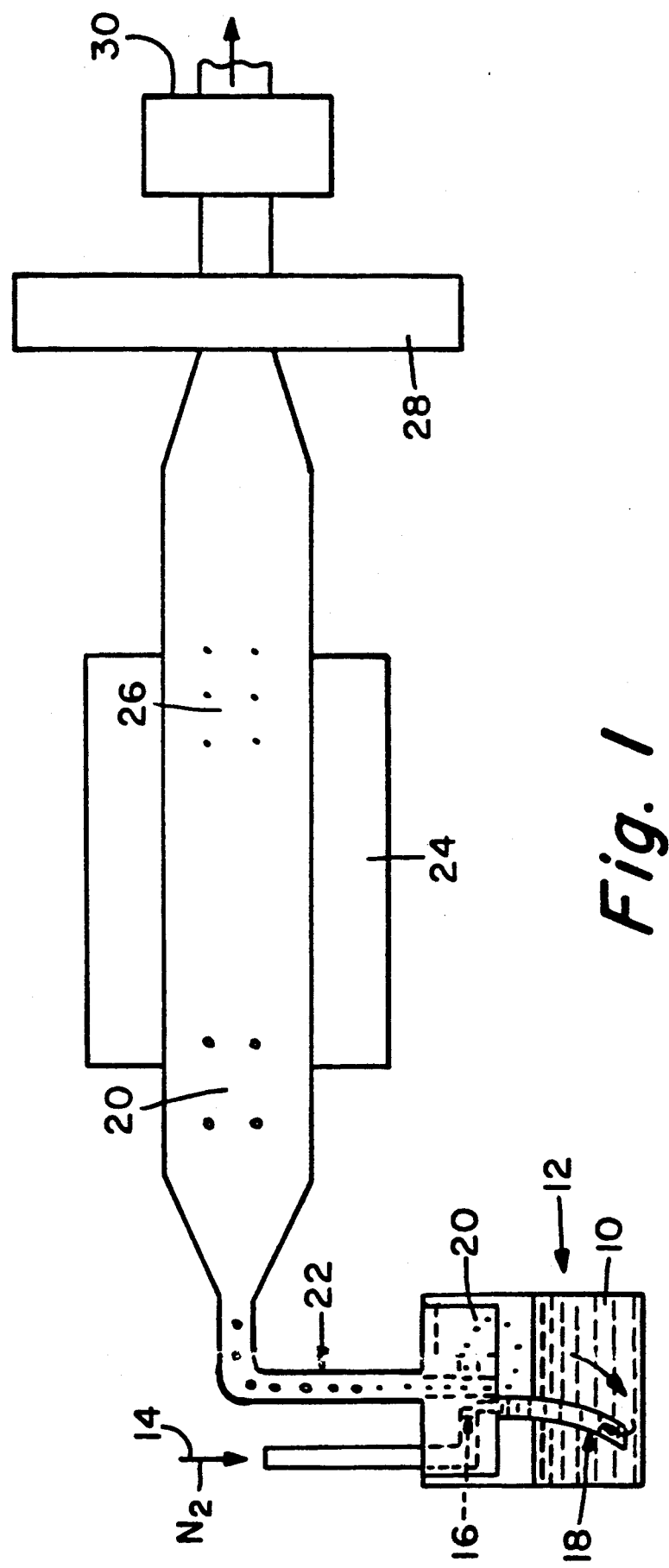
FIG. 1 is a schematic illustration of a furnace system for generating magnesium silicate particles from an aerosol stream.

The furnace system is schematically illustrated in FIG. 1 of the drawing. There, a starting solution 10 is placed in a commercial aerosol generator 12. A neutral gas, such as nitrogen or argon, is supplied from an external source 14, for example, at a pressure of 30-60 lbs/sq.in. and a flow rate of 4.7 liters/minute. The gas passes through an orifice located in jet nozzle assembly 16, and forms a high velocity jet. The high velocity jet creates a low pressure near the orifice. This causes solution 10 to be drawn up to the orifice in tube 18 where it is broken into tiny droplets 20. Droplets 20 circulate as indicated and proceed up pipe 22 to tubular furnace 24. The propelling force of the gas stream is supplemented by the drawing power of a vacuum pump 30 beyond tube furnace 24. Furnace 24 may be maintained at an elevated temperature, for example 1000° C. Thus, each droplet 20 is oxidized and coalesced into an individual particle as it passes through furnace 24. Particles 26, submicron in size, are collected at a filter 28 located outside the furnace.

Figure 3:
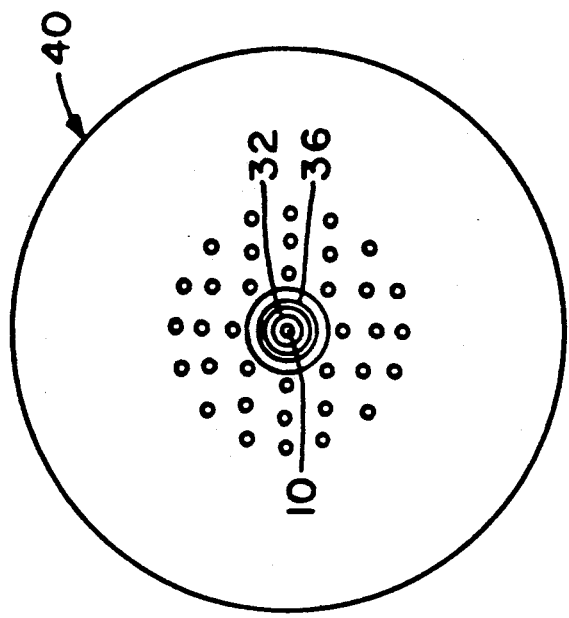
FIG. 3 is a view taken along line 3—3 of FIG. 2.
Figure 2:
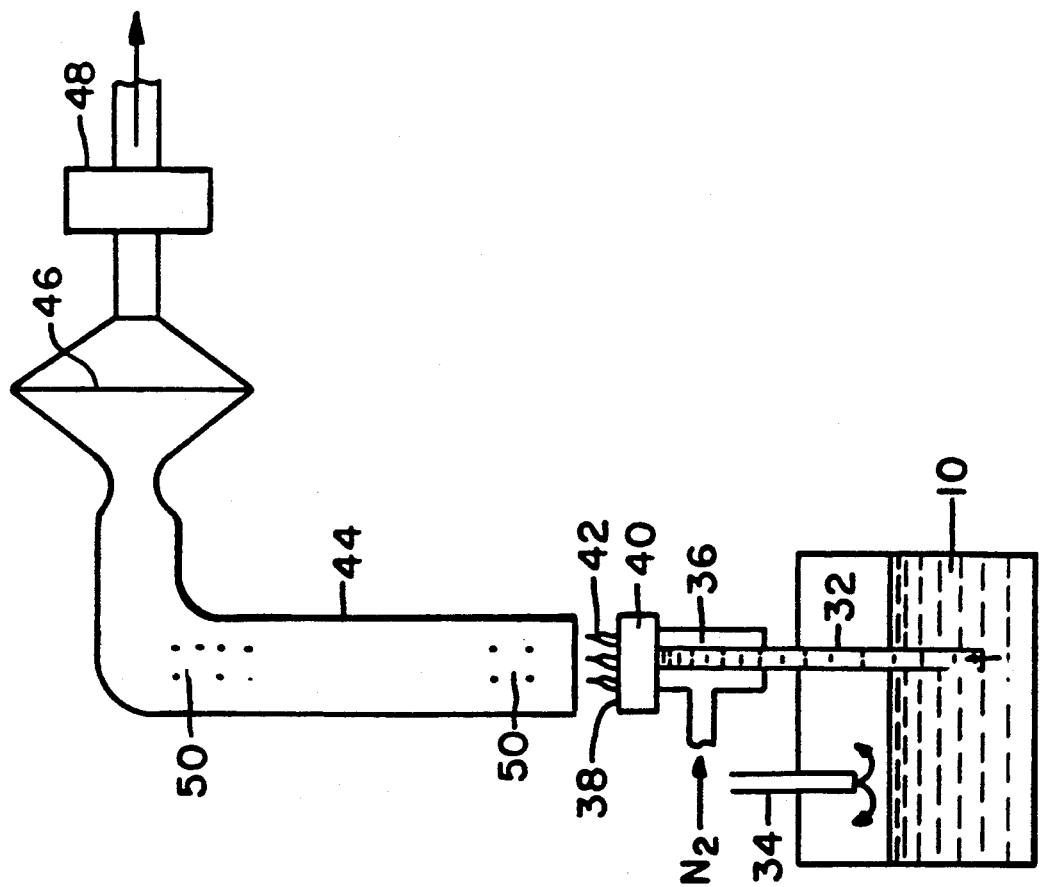
FIG. 2 is a schematic illustration of an alternate system, employing a burner, for the same purpose.

The alternate burner system is schematically illustrated in FIGS. 2 and 3. In this system, a flow of solution 10 in tube 32 is initiated by a pressurized gas from an outside source 34. Tube 32 is enclosed within concentric outer tube 36 through which a nitrogen stream, also from an external source, flows. The nitrogen stream in outer tube 36 impacts the flow of solution 10 in tube 32 at nozzle 38.

In the burner system, the aerosol nozzle 38 terminates in the center of a well focused burner 40. Thus, as droplets 20 form, they are swept, by gas pressure, through the flame 42 of burner 40. There, the droplets coalesce and oxidize to solid particles. The particles thus formed pass up glass tube 44 which terminates in a filter 46. Such passage is aided by a vacuum 48 being applied beyond the filter. Soot particles 50 collect on the walls of glass tube 44 as well as on filter 46, and may be removed periodically. It will be appreciated that the aerosol generator of the burner system may also be used in the furnace system.

Precursor magnesium and silicon compounds, selected for an effective aerosol technique, were, necessarily, thermally decomposable, readily solubilized, and compatible with a solvent. In addition, if a single solution were to be used, the selected compounds had to be compatible with each other, and with a common solvent. It was also desirable that a solution be stable and have good shelf-life, that it have good clarity, be free from undesirable contaminants and produce particles having desirable gelation characteristics.

A number of different solutions were tested with varying degrees of success. Initially, a single aqueous solution of $MgSiF_6$ was employed. This had the apparent advantages of a single material and appropriate stoichiometry. Enstatite particles could be produced. However, particle size distribution was broad (200-5000 Angstrom units), and a fluoride phase, $MgF_2$, was present.

Among other combinations tested were ethanol solutions of either magnesium acetate or nitrate in conjunction with an ethanol solution of tetraethyl orthosilicate. These combinations produce particles 0.1 to 0.3 microns in size. However, the acetate tended to produce some chains, and the nitrate some hollow spheres, both undesirable for further processing.

Attention then turned to alkoxide solutions, in particular an aqueous solution of magnesium ethoxide and an aqueous-ethanol solution of tetraethylorthosilicate. Because these solutions tended to gel when mixed, a double aerosol system was devised to keep the solutions separate until the aerosol streams were formed. The streams were then commingled just prior to entering the furnace or burner.

This procedure was successful in producing solid, unagglomerated, spherical particles 200-1000 Angstrom units in diameter with a surface area of 115 $m^2$/gram. Careful monitoring of flow rates enabled maintaining constant stoichiometry in the particles. By varying flow rates, the particle composition could be varied over a substantial range. However, a system that avoided the necessity of close controls was obviously desirable.

An extended search led to discovery of a common solvent that produced a stable solution of magnesium ethoxide and tetraethyl orthosilicate. The solvent is ethylene glycol monomethyl ether. In preparing the solution, the magnesium ethoxide is preheated at low temperature, e.g., about 250° C., under vacuum. The solvent is then added at room temperature while stirring. The tetraethyl orthosilicate is added subsequently with further stirring at low heat.

Used in the burner system, this solution yielded unagglomerated, solid spheres 300-600 Angstrom units in diameter with a surface area of 180 $m^2$/gram. Stoichiometry was maintained essentially constant within limits of ±0.5% by weight.

The primary utility for the particles produced by the aerosol procedure is as an intermediate in the production of dense, tough, cast bodies by the soot casting technique. This process requires:

a. Small particle size. Reduction of the high surface area of particles tenths of microns in diameter provides the driving force for densification during sintering.

b. Close packing of particles. This provides good green density, and is achieved through high volume loading of solids in the precursor colloid. Loading up to 30% by volume has been achieved.

c. Uniformity in packing. This insures uniform densification during sintering.

The particles are dispersed in a suitable medium by means of known dispersants. This forms a fluid colloid that may be cast in desired form, as by pouring in a mold and then exposed to a gelling agent.

Dispersing media and dispersants are widely used and commercially available. The medium and the dispersant must be compatible. For present purposes, the ability to maximize loading of solids, without adversely compromising the viscosity necessary for handling and molding, is important. Ultimately, of course, the colloid must respond positively to a gelling agent to provide a uniformly dense, green body. However, it may also be desirable that the colloid have good stability in the event the gelling process is delayed.

We have found that chloroform, methylene chloride and various alcohols are excellent media for dispersing enstatite particles. Particularly effective dispersants are Triton X-171, (an alkylaryl polyether alcohol and sulfonate blend containing ·15% xylene, 75-80% octylphenoxy polyethoxyethanol and 5-10% calcium dodecylbenzene sulfonate) and Triton W-30 (an aqueous solution containing 27% sodium alkylaryl ether sulfate, 27% 2-propanol and 46% water). All percentages are by weight.

Combinations of medium and dispersant found successful were:
1. Chloroform plus X-151, X-171, W-30, or stearic acid.
2. Methylene plus X-171.
3. Methanol plus methylene chloride or chloroform.
4. Propanol plus X-151.

A four step process is used to homogenize an enstatite particle colloid prior to gelling. First, the colloid is subjected to intense shaking, as on a paint mixer. The colloid is then subjected to a high shear mixer for up to ten minutes. Next, the colloid is degassed in a vacuum sufficient to cause bubbles to emerge, but not to result in boiling. Finally, the material is subjected to an ultrasonic bath for several minutes to complete degassing.

The homogenized colloid may then be poured into a container or mold of desired shape. The colloid is then exposed to a gelling agent. This may be flowing ammonia gas or ammonium hydroxide. The semi-solid gel may then be dried in air to a crack-free body. The dried gels are sufficiently rigid so that they can be readily sawed and cut to smooth pieces without crumbling.

Sintering tests were performed on rectangular prisms, 7-15 mm. in length, that were cut from bodies of dried gel. Sintering cycles were evaluated with respect to effect on density of the sintered body, and with respect to effect on minimizing the proportion of clinoenstatite in the body. The latter effect enhances the proportion of protoenstatite and orthoenstatite, thus optimizing the opportunity for martensitic behavior. Sintering cycles were evaluated with maximum hold temperatures from 1000° C. to 1450° C., hold times of 30 minutes to four hours, and heating rates of two to over ten °C./minute. Also, a variety of different atmospheres were checked.

The sintering atmosphere has a profound effect on densification of enstatite monoliths. Oxidizing atmospheres, such as air or oxygen, result in a "Swiss cheese" texture, with closed intragranular pores, and very coarse grain sizes. A reducing atmosphere, on the other hand, greatly fosters densification, with no secondary grain growth. Neutral atmospheres, such as He or Ar, result in intermediate grain size and relatively good densification. Two samples, A and B, were sintered with the same thermal history, but with differing atmospheres. Oxygen gave a grain size of 50 microns, and $H_2/N_2$ gave a 1-2 micron grain size.

We are uncertain as to the exact mechanism involved in our inventive method. However, we believe that $H_2/N_2$ reduces carbon present in the dried, grain-coating dispersant, thus making it available to react with Si and Mg to form volatile compounds. For example, Si and Mg might volatilize as SiO and $Mg_3N_2$ or a Mg-alkoxide, due to the low vapor pressure of these compounds. The atomic vacancies so produced provide the path for effective densification through volume diffusion.

Initial sintering cycles had peak temperatures in excess of 1350° C. Even at these high temperatures, densification could not be achieved in an oxidizing atmosphere. The sample referred to above as A was sintered at 1450° C. in air, while that identified as B was sintered in forming gas ($N_2/H_2$) at the same temperature.

Decreasing the maximum hold temperature does not have as pronounced an effect on microstructure as varying the sintering atmosphere. At temperatures below 1250° C., little densification takes place in an oxidizing atmosphere. The microstructure consists of necked, or even unsintered, spheres up to 0.3 microns in diameter. In contrast, a sample sintered at 1280° C. in forming gas had a dense microstructure consisting of interlocking grains 1-2 microns in size. With maximum firing temperatures of 1100° C. and 1075° C., the grain sizes were, respectively, 1 micron and 0.5 micron.

At 800° C. in a sintering cycle, the phase assemblage (initially amorphous phase plus forsterite and periclase) has not changed. However, by 850° C., it consists principally of forsterite with traces of enstatite. After 45 minutes at 1000° C., the assemblage has not changed.

The data above indicate that shrinkage, observed through dilatometry, corresponds to the transition from the amorphous to the crystalline state, coupled with volume diffusion to account for the excess shrinkage. Forsterite is thermodynamically unstable relative to enstatite at and below 850° C. This is the temperature at which the first enstatite peaks are observed on XRD traces. Nevertheless, forsterite is the first phase to appear, because it grows epitaxially on the nuclei that are already present in the starting powder. Forsterite persists metastably at these low temperatures, and it is not until higher temperatures that there is enough thermal energy to overcome the kinetic barrier for the transformation. In forming gas, there is still considerable forsterite at 1100° C.; by 1200° C. it is reduced to trace amounts.

Once forsterite disappears, increasing the maximum hold temperature increases the proportion of protoenstatite to clinoenstatite. This improves mechanical behavior due to the increased potential for martensitic transformation to clinoenstatite. At temperatures in excess of 1200° C., clinoenstatite can be virtually eliminated in favor of protoenstatite in 30 minutes. At lower temperatures, the complete reaction requires hold times over four hours. High sintering temperatures are not desirable, however, because they lead to cracking of the samples. The transformation from clino- to protoenstatite, involving a positive volume change of 5-6%, is probably responsible for the cracking observed.

Similar to the effect of varying maximum temperature, varying the heating rate does not have a pronounced effect on densification, provided that a reducing atmosphere is present. Samples have been brought up to temperature in $H_2/N_2$ at rates varying from 2° to 30° C./min. This resulted in fine (1-3 microns in size) aggregates of interlocking grains.

Heating rate does, however, seem to have a significant effect on fracturing during sintering. Not surprisingly, samples heated at high heating rates (over 10° C./min) invariably crack, whereas slow heating rates of 2° C./min reduce cracking problems. Samples brought up to 1075° C. at 2° C./min have not cracked.

A series of experiments was designed to study the effect of changing atmospheres during sintering, specifically forming gas and air. Samples were brought up at 2° C./min in one of these two gases to the onset of shrinking, as determined by ongoing dilatometry. At this point, the flowing gas was changed. In one case, the change was maintained to the end of the run. In another case, the change was only to the end of shrinkage, when the gas was switched back to the initial one.

It was found that air has its most detrimental effect prior to the beginning of shrinking. Samples sintered in air from room temperatures to 800° C. did not sinter. Total shrinkage was only 5.8%, and the microstructure consisted of necked submicron spheres in an open network. It is apparent that air causes necking of the particles. This reduces their surface area, and lowers the driving force for sintering.

Completely different results were obtained in samples sintered in $H_2/N_2$ to 800° C., in air (no flow) from 800°-850° C., and then in forming gas again to the completion of the run. In this case, an incremental shrinkage of approximately 2% was observed (to a total of 28-30%, up from the average of 26%) upon switching back to forming gas when shrinking was slowing down. The maximum temperature for the run was 1075° C., and the hold, 240 min. The resulting microstructure was interlocking grains 0.5 microns in size.

Changing atmosphere also has an effect on phase stability. Initial experiments indicate that, relative to forming gas, air slows down the reaction: forsterite+-silica enstatite. Thus, a sample, sintered in $H_2/N_2$ for 4 hrs at 1100° C., consists of proto-, clino-, and orthoenstatite. In contrast, a sample with the same thermal history, but sintered in forming gas to 800° C., then air to 850° C., followed by forming gas to 1100° C., has residual forsterite ($+SiO_2$).

The optimum densification conditions for enstatite monoliths are:
Heating rate: 2° C./min
Atmosphere:
   Forming gas to 800° C.
   Air (no flow) to 850° C.
   Forming gas to completion of the run
Maximum temperature: 1075° C.
Hold time: 240 min.

The above conditions result in a crack-free, interlocking aggregate of proto-, ortho-, and clinoenstatite grains 0.5 microns in size. Longer hold times eliminate residual clinoenstatite and slightly enlarge grain size. These effects are easily accomplished in 4 hrs at 1100° C., but this temperature may give rise to cracking problems.

We claim:

1. A method of producing essentially pure, ceramic particles composed of MgO and $SiO_2$ in constant stoichiometry which comprises forming a solution of magnesium ethoxide and tetraethyl orthosilicate in a solvent of ethylene glycol monomethyl ether, generating an aerosol from the solution, and subjecting the aerosol to a thermal influence to decompose the magnesium and silicon compounds to the respective oxides and to convert the liquid droplets into solid particles of sub-micron size and composed of MgO and $SiO_2$ in constant stoichiometry.

2. A method in accordance with claim 1 wherein the atomic ratio of Mg:Si in the sub-micron sized particles is 1:1.

3. A method in accordance with claim 1 wherein the magnesium compound and the silicon compound are dissolved individually to form separate solutions which are combined before generation of an aerosol.

4. A method in accordance with claim 1 wherein the atomic ratio of Mg:Si in the aerosol subjected to a thermal influence is 1:1.

5. A method in accordance with claim 1 wherein the aerosol is generated by forming a stream of solution and subjecting the stream to a gaseous impact to break it into droplets.

6. A method in accordance with claim 5 wherein the impacting gas is pressurized nitrogen.

7. A method in accordance with claim 1 wherein the thermal influence is a tubular furnace through which the aerosol passes.

8. A method in accordance with claim 7 wherein the aerosol is drawn through the furnace by suction.

9. A method in accordance with claim 1 wherein the thermal influence is a burner and the aerosol is directed into the flame of the burner.

10. A method in accordance with claim 1 wherein the solid particles formed are 300-600 Angstrom units in diameter.

11. A method in accordance with claim 1 wherein the solid particles, formed under thermal influence, are collected on a filter.

12. A method in accordance with claim 1 wherein the solid particles, formed under thermal influence, are dispersed in a medium to form a colloidal sol.

13. A method in accordance with claim 12 wherein the medium is an organic liquid.

14. A method in accordance with claim 13 wherein the organic liquid is selected from a group consisting of chloroform, methylene chloride and an alkyl alcohol.

15. A method in accordance with claim 13 wherein the organic liquid medium contains a dispersant.

16. A method in accordance with claim 12 wherein the solids content in the colloidal sol is up to 30% by volume.

17. A method in accordance with claim 16 wherein the solids content is 25-30% by volume.

18. A method in accordance with claim 12 wherein the colloidal sol is subjected to a gelling agent to form a semi-solid gel.

19. A method in accordance with claim 18 wherein the gelling agent is a source of ammonia.

20. A method in accordance with claim 19 wherein the gelling agent is ammonia gas.

21. A method in accordance with claim 18 wherein the colloidal sol is poured into a form before being subjected to the gelling agent.

22. A method in accordance with claim 18 wherein the gel is dried in air.

23. A method in accordance with claim 22 wherein the dried gel is sintered to form a dense body composed essentially of pure enstatite.

24. A method in accordance with claim 23 wherein the maximum sintering temperature is in the range of 1000°–1450° C.

25. A method in accordance with claim 24 wherein the body is held at the maximum sintering temperature for 30 minutes to four hours.

26. A method in accordance with claim 24 wherein the body is heated to maximum sintering temperature at a rate of 2°–10° C./minute.

27. A method in accordance with claim 23 wherein the body is heated to at least 800° C. in a non-oxidizing atmosphere.

28. A method in accordance with claim 27 wherein the atmosphere is forming gas.

29. A method in accordance with claim 27 wherein the body is further heated to sintering temperature in the non-oxidizing atmosphere.

30. A method in accordance with claim 27 wherein the atmosphere is changed to an oxidizing atmosphere from 800° to 850° C.

31. A method in accordance with claim 30 wherein the atmosphere is switched back to a non-oxidizing atmosphere at 850° C. and continued in such atmosphere through the sintering cycle.

32. A method in accordance with claim 31 wherein the body is heated at a rate of 2° C./minute to 1075° C. and held for four hours before cooling and the atmosphere is forming gas to 800° C., air to 850° C. and forming gas to 1075° C.

33. A method of producing an essentially pure, sintered enstatite body which comprises dissolving magnesium ethoxide and tetraethyl orthosilicate in ethylene glycol monomethyl ether, both compounds being thermally decomposable and being dissolved either in a single solution or separately, generating an aerosol from the solution(s), subjecting the aerosol to a thermal influence to create solid particles of constant stoichiometry from the aerosol droplets, drying the particles, dispersing the particles in a non-aqueous, non-polar solvent to form a colloidal sol, exposing the sol to a gelling agent, drying the gel to a porous rigid body and sintering the body to a pure enstatite body.

34. A method in accordance with claim 33 wherein an aerosol is generated by impacting a stream of solution with a pressurized gas to convert the stream to droplets.

35. A method in accordance with claim 33 wherein the thermal influence is a furnace.

36. A method in accordance with claim 33 wherein the thermal influence is a burner and the aerosol is directed into the burner flame.

37. A method in accordance with claim 33 wherein the solid particles are dried.

38. A method in accordance with claim 33 wherein the colloidal medium is an organic liquid and contains a dispersant.

39. A method in accordance with claim 33 wherein the gelling agent is a source of ammonia.

40. A method in accordance with claim 33 wherein the maximum sintering temperature is 1000°–1450° C. and the hold time at that temperature is 30 minutes to four hours.

41. A method in accordance with claim 33 wherein the body is heated to sintering temperature at a rate of 2°–10°/minute.

42. A method in accordance with claim 33 wherein the body is heated to at least 800° C. in a non-oxidizing atmosphere.

43. A method in accordance with claim 42 wherein the body is heated between 800° and 850° C. in an oxidizing atmosphere and then a non-oxidizing atmosphere is restored.

* * * * *